United States Patent [19]

Carter et al.

[11] 4,105,329

[45] Aug. 8, 1978

[54] TOTAL IMMERSION TRANSFER OF PHOTOGRAPHIC IMAGES BETWEEN SPROCKET-REGISTERED STRIPS OF FILM

[75] Inventors: William D. Carter, Beverly Hills; Martin S. Mueller, Rancho Palos Verdes, both of Calif.

[73] Assignee: Carter Equipment Co., Inc., Lawndale, Calif.

[21] Appl. No.: 791,135

[22] Filed: Apr. 26, 1977

[51] Int. Cl.$^2$ .................. G03B 27/02; G03B 27/10; G03B 27/20
[52] U.S. Cl. .................................. 355/91; 355/111; 355/132
[58] Field of Search ............ 355/132, 78, 79, 90, 355/91, 108, 110, 19, 111, 106, 103, 97–100, 30

[56] References Cited

U.S. PATENT DOCUMENTS

| | | | |
|---|---|---|---|
| 1,381,840 | 6/1921 | Jeapes | 355/103 |
| 2,552,255 | 5/1951 | Capstaff | 355/111 |
| 2,747,478 | 5/1956 | Capstaff et al. | 355/111 |
| 2,856,829 | 10/1958 | Orlando | 355/27 X |
| 3,488,121 | 1/1970 | Dassonville | 355/90 |
| 3,664,738 | 5/1972 | Cameron | 355/91 X |

FOREIGN PATENT DOCUMENTS 964,371   5/1957   Fed. Rep. of Germany ............ 355/19

OTHER PUBLICATIONS

10/1957 Journal of the SMPTE, vol. 66, pp. 607–612, Printing Motion-Picture Films Immersed in a Liquid, J. Stott et al.

Primary Examiner—Donald A. Griffin
Attorney, Agent, or Firm—Gene W. Arant

[57] ABSTRACT

A printing tank contains a body of transparent liquid within which a main printing sprocket is totally immersed. Mechanism is provided for feeding one edge of a master strip of film onto the sprocket and in a curved path around a portion of the circumference of the sprocket. A curved support is provided to support the other edge of the master strip of film in a parallel relationship. An illuminated window is positioned between the sprocket and the curved support. A space between the window and the master strip of film is filled with the transparent liquid.

In operation, the master strip of film is sprocket-registered while passing the printing aperture effected by the illuminated window. Means are also provided for transporting an unexposed strip of film in sprocket registry with the master strip of film at the aperture.

15 Claims, 3 Drawing Figures

TOTAL IMMERSION TRANSFER OF PHOTOGRAPHIC IMAGES BETWEEN SPROCKET-REGISTERED STRIPS OF FILM

PRIOR ART

Continuously driven printing machines for transferring photographic images from one moving strip of film to another are well-known, one being shown, for example, in the Jeapes Pat. No. 1,381,840 of 1921.

In order to minimize or eliminate optical effects of scratches and other damage to the preprint or master film, it is also well-known to immerse a film that is being projected in a body of transparent liquid having an index of refraction approximately identical to that of the film. This technique is described, for example, in several articles which appear in the October, 1957 and October, 1958 issue of the Journal of the Society of Motion Picture and Television Engineers.

Liquid immersion printers of the continuous contact type have been shown, for example, in Dassonville Patent No. 3,488,121 issued in 1970 and in Cameron Patent No. 3,664,738 issued in 1972. An earlier design had been shown by Stott and others in the October, 1957 issue of JSMPTE at pages 607 to 612.

BACKGROUND OF THE INVENTION

Motion picture printers have now been known and used for many decades.

Effective transfer of images from one moving strip of film to another requires both good contact between the strips and precise alignment of the respective frames of the strips relative to each other. Many techniques have been devised for counteracting or offsetting creep, shrinkage, or other mechanical problems that will interfere with either close contact or precise alignment of the strips of film.

When liquid immersion is utilized as a means of improving the optical quality of image transfer, additional problems arise. One such problem is that the strip of film may carry foreign objects or other contamination which take on optical significance. Another such problem is that any turbulence created in the liquid bath tends to produce bubbles which detract from the quality of image transfer.

When it is desired to transfer images during rapid movement of the strips of film the creation of turbulence in a liquid body in which the strips of film are immersed appears unavoidable. Hence the specific problem with which the present invention deals is how to obtain the benefit of liquid immersion during image transfer, while the strips of film are traveling through the printer at high speeds, but yet at the same time avoiding the undesirable effects of turbulence in the liquid.

It is, therefore, a primary object of the present invention to provide a motion picture printer, which printer permits the total immersion of two or more strips of film in intimate contact with each other at the point of exposure of one of such films.

A further object of the present invention is to provide a motion picture printer, as aforesaid, which printer transfers a photographic image from one or more master strips of film to another strip of film while all such strips are in continuous motion at a uniform rate across an illuminated aperture.

Another object of the present invention is to provide a motion picture contact printer, as aforesaid, which has a printing sprocket immersed in a bath of liquid solution, and is adapted to hold two or more strips of film in intimate contact therewith and without significant slippage between same.

Another additional object of the present invention is to provide a motion picture printer, which printer permits utilization of same for continuous optical printing.

Yet a further object of the present invention is to provide a motion picture printer, as aforesaid, which has a printing sprocket immersed in a bath of liquid solution, and is adapted to act as a projector.

Further and additional objects of the present invention include having a photographic printer which is simple of construction and economical to manufacture; having a sprocket immersed in a liquid bath at the point of exposure for a strip of film; having an apparatus which permits such strips of film to have linear speed in excess of 200 feet per minute; and having an apparatus which permits both contact printing, step optical printing, as well as other continuous printing known in the industry.

Yet another object of the invention is to provide a motion picture printer as aforesaid, which is effective and reliable in operation, as well as economical.

SUMMARY OF THE INVENTION

Briefly speaking, the present invention provides an improved apparatus of the type shown in the article by Stott et al in FIG. 8 on page 611 of the October, 1957 issue of JSMPTE.

According to one feature of the invention a free loop of the moving strips of film is utilized in conjunction with a gate or confining means at the aperture.

According to another feature of the invention the printing tank is provided with a hinged door which greatly facilitates access to the mechanism of the printer, so that the printer can be loaded with the film before it is filled with liquid, and with minimum movement or readjustment of the operating mechanisms.

An additional feature of the invention is the provision of separate entrance, contact, and exit squeegee wiper blades, which wipe foreign matter or air bubbles from the optical surfaces of the moving strips of film.

Another feature of the invention is that the lenses utilized for supplying light to the printing aperture are contained within a hollow housing, and thereby operate in air rather than in a liquid environment.

A further feature of the invention is the utilization of the underside of the main printing sprocket for film exposure and registry, thereby obtaining maximum utilization of the body of liquid within which the sprocket is totally immersed.

Yet another feature of the invention is the construction of the printing tank with two separate liquid compartments, one for entry of the moving strips of film and the other for the printing operation, so that the wiping of foreign particles and air bubbles from the moving strips of film can be substantially accomplished prior to their entry into the main compartment.

DRAWING SUMMARY

PREFERRED EMBODIMENT

Figure 1:
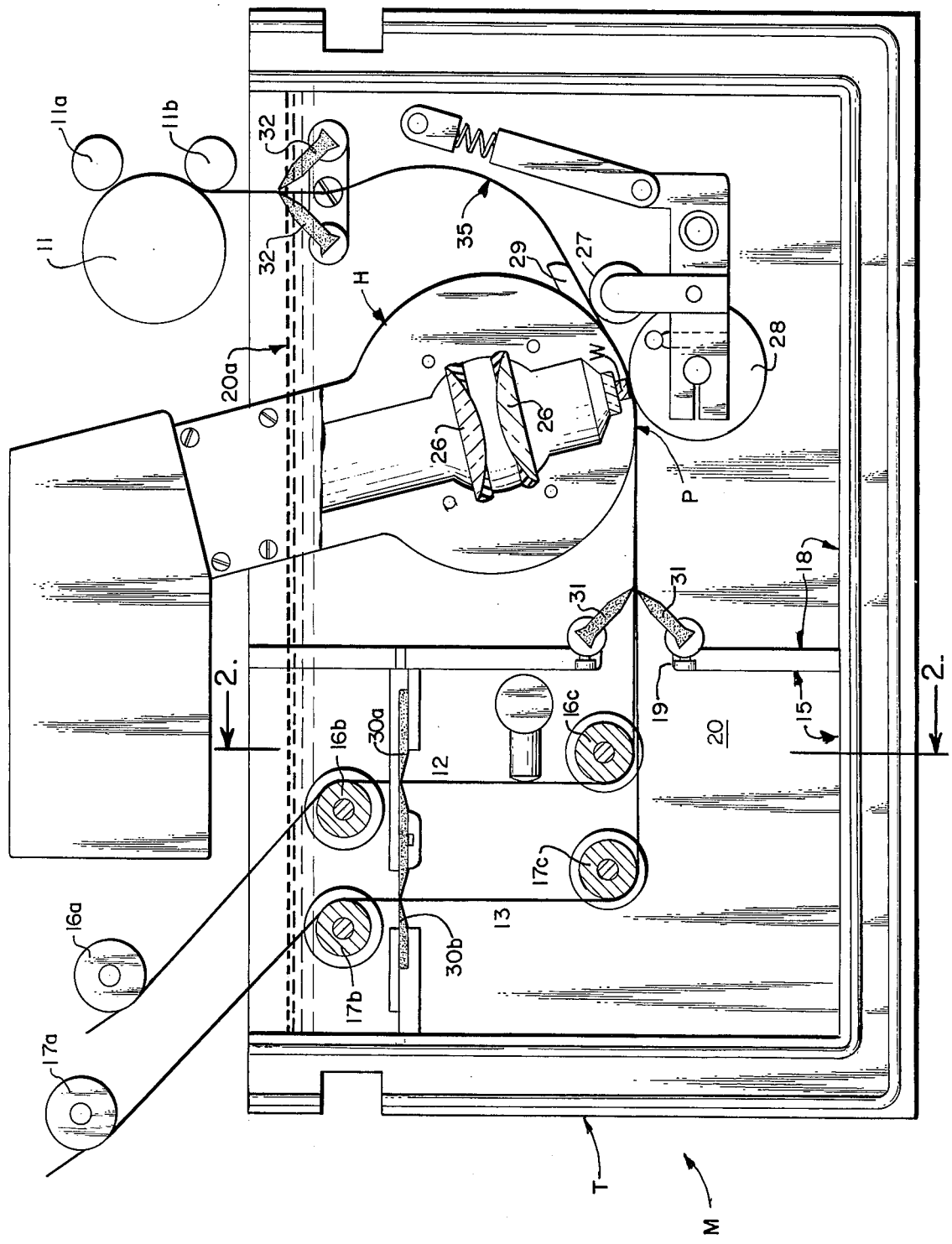
FIG. 1 is an elevation view, partially in cross-section, of a photographic continuous contact printing machine embodying the presently preferred form of the invention.

In the drawings the machine M includes a tank T of generally rectangular configuration filled with a transparent liquid body 20 whose surface 20a is maintained a short distance below the top of tank T. The tank T is divided into two compartments by means of a vertical bulkhead or dam B which is located somewhat to the left of center of the tank as it appears in the drawing. The left-hand compartment 15 is initially entered by the strips of film which then pass through an opening 19 in bulkhead B in order to enter the right-hand compartment 18 where the actual printing operation takes place.

A master strip of film 12 having photographic images thereon, and a printing strip of film 13 onto which the images are to be transferred, enter the liquid bath 20 in compartment 15, with the master strip of film 12 being nearer to bulkhead B than is the strip 13. Master strip of film 12 passes over a roller 16a before entering the liquid bath, a roller 16b shortly after entering the bath, and then passes over a roller 16c in order to make approximately a 90 degree change in its direction of movement as it passes horizontally through the bulkhead opening 19. In similar fashion the strip of film 13 passes over a roller 17a outside the tank, roller 17b shortly after entering the liquid bath, and roller 17c to change its direction of movement to horizontal so that it may enter the bulkhead opening. Both strips of film are fed to their respective tensioning and guide rollers as shown in the drawings from conventional film transport mechanism, not shown. Those skilled in the art will recognize that rollers 16a, 17a are tensioning rollers while rollers 16c, 17c are guide rollers.

As the master strip of film 12 leaves roller 16b it passes through an entrance pair of flexible squeegee wiper blades 30a whose purpose is to wipe the film free of foreign matter or air bubbles and also to prevent air bubbles from moving downward into the liquid bath. In similar fashion the strip of film 13 passes through an entrance pair of squeegee wiper blades 30b after leaving roller 17b and before engaging roller 17c. The two strips of film converge towards each other at a very narrow angle as they pass through bulkhead opening 19, and on the right-hand side of the bulkhead opening a contact pair of flexible squeegee wiper blades 31 engage the outer surfaces of respective ones of the strips of film, causing them to come into engagement in intimate contact, and at the same time further wiping the exterior surfaces of the strips of film.

In the printing compartment 18 there is located a stationary housing H which has a generally cylindrical surface portion S. The pair of strips of film 12, 13 move toward a point P of tangency with the cylindrical surface S, that point of tangency being at the bottom of the housing H as seen in the drawings. The strips of film then follow a curved path parallel to about 30 degrees of the circumference of the cylindrical surface S and then pass away from the housing H and freely in a slack loop 35 (FIG. 1) through the liquid bath 20. Upon exiting from the liquid bath the strips of film 12 and 13 pass through an exit pair of flexible squeegee wiper blades 32 in order to remove all or most of the liquid from their external surfaces. The strips of film are then taken up on the take-up portion of a conventional film transport mechanism, including the sprocket 11 and rollers 11a, 11b.

Figure 3:
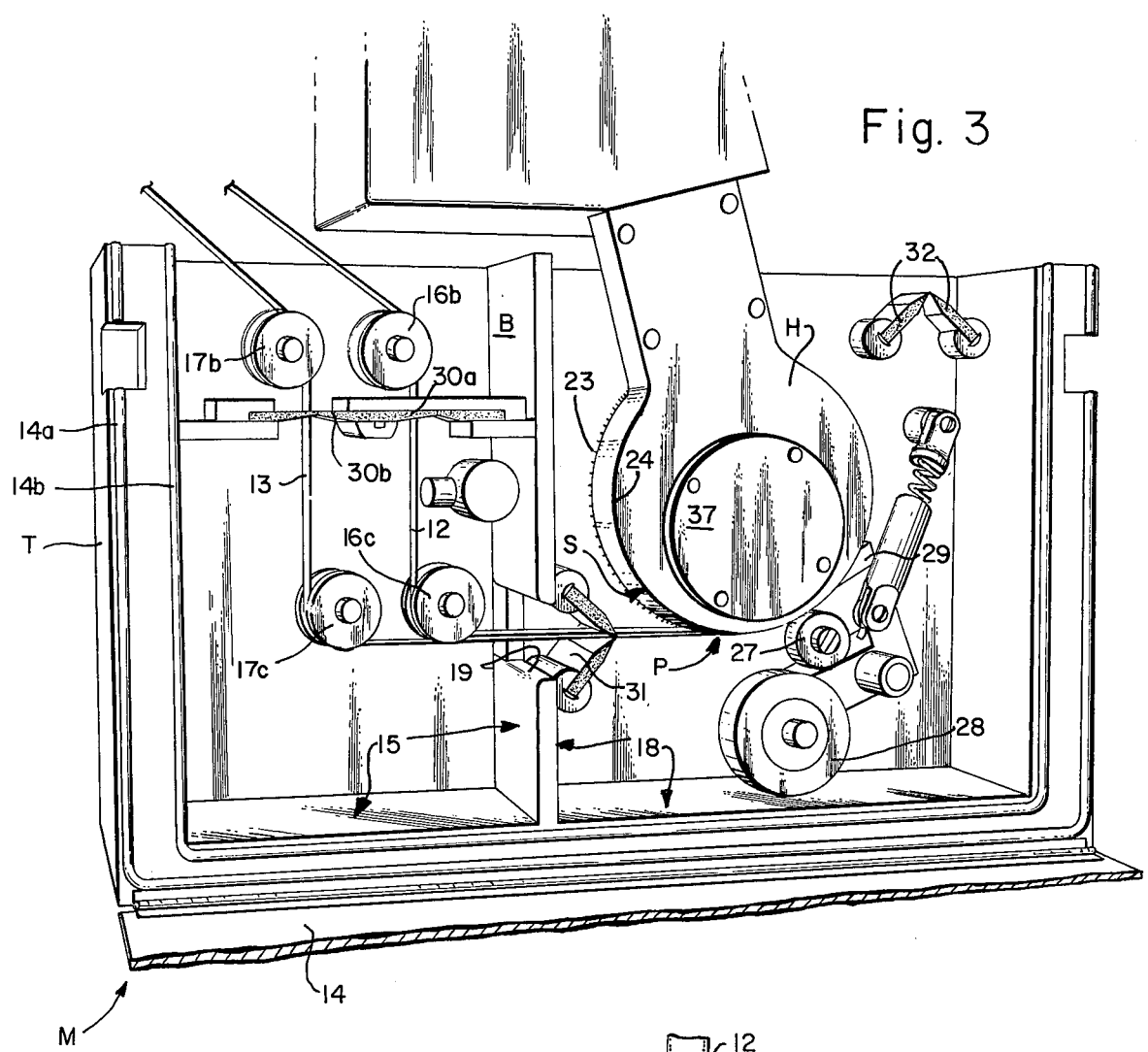
FIG. 3 is generally similar to FIG. 1 but with the internal parts of the machine being shown in an isometric view.

A window W is incorporated in the lower wall of housing H, being located at about the longitudinal center of the curved pathway of the strips 12, 13, i.e., about 15 degrees beyond the point P. Within the housing H and its associated structures are provided lens means 26 for projecting light towards and through the window W so as to effect a printing aperture across which the strips of film pass. Housing H has a removable cover 37 (FIG. 3), which shields the interior of the housing from the liquid body so that lens means 26 operate in air.

A conventional main printing sprocket 23 is rotatably mounted on one side of stationary housing H, being the backside thereof as seen in the present drawings. It is significant that sprocket 23 is entirely immersed in liquid bath 20 so that, when it rotates, its teeth are not exposed to air. The diameter of cylindrical surface S of the housing is somewhat less than the root diameter of the sprocket.

Figure 2:
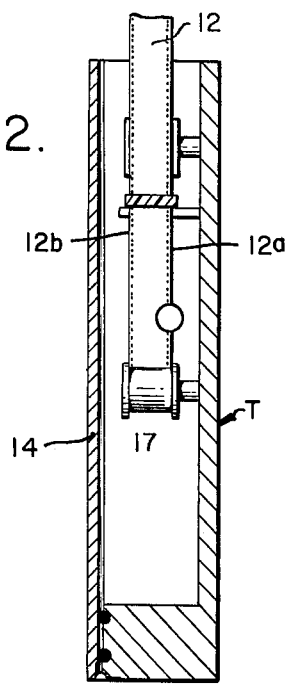
FIG. 2 is a vertical cross-sectional view of the apparatus taken on line 2—2 of FIG. 1.

As best seen in FIG. 2, the master strip of film 12 has an inner edge 12a in which perforations are formed, and an outer edge 12b in which perforations are also formed. In similar fashion, although not specifically shown, the strip of film 13 also has perforations formed on both its inner edge and outer edge. According to the presently preferred form of the invention both strips of film are driven past window W by engagement of the sprocket with the perforations on the inner edges, only, of the strips of film.

The inner edge 12a of master strip of film 12 is supported at the root diameter of the sprocket 23. A raised rim 24 on the outer edge of curved surface S of housing H provides a curved support that is parallel to the root diameter of the sprocket. The outer edge 12b of the master strip of film rests upon this curved support, with the result that there is a channel or space between window W and the master strip of film 12, through which channel or space the liquid 20 may move.

Sprocket 23 is positively rotatably driven in order to pull both strips of film past the printing aperture, and in so doing is opposed by tensioning action of the tensioning rollers 16a, 17a, all in a well-known and conventional manner. The sprocket teeth act upon the leading edges of the perforations of both strips of film and thereby ensure precise alignment of the two strips of film at the printing aperture.

In order to ensure that the strips of film do not jump off the sprocket teeth while passing the printing aperture the outer surface of strip 13 is confined by a roller 28. A stripper device 29 is positioned adjacent housing H on the right-hand side thereof to ensure that the strips of film 12, 13 are disengaged from the sprocket at the desired point. An additional roller 27 engages strip of film 13 opposite the stripper device 29 in order to precisely control this portion of the trajectory of the strips of film. The rollers 27, 28 are mounted on a single mounting mechanism which permits them to be withdrawn from their operative positions when the strips of film are being initially loaded into the machine, and then to be subsequently placed in their operative position with a suitable amount of clearance for the moving strips of film.

STARTING THE MACHINE

In order to start the machine tank T is emptied of liquid and side wall 14 (FIG. 3) is lowered. The rollers 27, 28 are withdrawn to the position shown in FIG. 3.

Both strips of film are loaded into the supply portion of the transport mechanism and threaded through the tensioning and guide rollers, wiper blades 30 and 31, onto the sprocket at the printing aperture, and through wiper blades 32 to the take-up portion of the transport mechanism. When the strips of film have been fully threaded into the machine the rollers 28, 27 are placed in their operative position. The lid 14 is closed. Then tank T is filled with the liquid 20. Lid 14 is sealed by O-rings 13a, 14b.

OPERATION

In operation, the entrance wipers 30 and the contact wipers 31 are effective to wipe air bubbles as well as foreign materials from both surfaces of the strips of film 12, 13 before they pass the printing aperture. At the aperture the channel or space between housing surface S and the strips of film permits a layer of transparent liquid to exist on the inner side of the master strip of film 12. The previous immersion of both strips of film has already permitted the transparent liquid to fill any gaps or cervices that may exist in the mutually facing surfaces of the two strips of film. Adequate spacing is maintained by roller 28 for movement of the strips of film 12, 13 while being supported by sprocket 23 and curved support 24 and being transported past the aperture by sprocket 23. Precise registration of the strips of film as they pass the printing aperture is provided by the pulling action of the sprocket teeth on the leading edges of the perforations on the inner edges of the respective strips of film.

Correctness of the longitudinal alignment is ensured by the fact that the strips of film are only wrapped around about 30° of the circumference of the sprocket 23. The extent of the wrap provides a pulling action by a sufficient number of the sprocket teeth but without so many teeth being involved that there is ambiguity as to the relative longitudinal alignment of the strips of film.

The machine can operate at a very high linear running speed of the strips of film, in excess of 200 feet per minute.

ALTERNATE FORMS

In lieu of the rim 24 the outer edge 12b of the master strip of film 12 may instead be supported by another sprocket similar to sprocket 23 or by a rail or ring of similar effective radius.

While the invention is presently illustrated as driving the strips of film across the aperture by engaging the sprocket teeth in perforations on one edge of the strips of film, it is only required that there be at least one row of perforations on each film, and that these rows coincide.

While the roller 28 has been illustrated as the means of confining the strips of film at the printing aperture, other such devices or a stream of liquid may be utilized for that purpose if so desired.

While the present illustration shows transfer of images from only one strip of film to another, the apparatus may be modified so that images may be transferred from two master strips of film concurrently to a third or unexposed strip of film, if so desired.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. A continuous contact method of transferring photographic images from a master strip of film onto an unexposed strip of film, both of which have perforations along one edge, comprising the steps of:
    placing a rotatably mounted main printing sprocket within a printing tank so that when the printing tank is filled with liquid the sprocket will be totally immersed therein;
    placing an arcuately curved support in spaced relationship to the sprocket and parallel to a portion of the circumference of the sprocket taken at the root diameter thereof;
    placing an illuminated window between the curved support and the sprocket, but spaced within the root diameter of the sprocket;
    threading the master strip of film, with the unexposed strip of film superimposed thereon, upon the sprocket so that the perforations of both strips of film are engaged by the sprocket teeth while the other edge of the master strip film is slidably supported upon said curved support;
    filling the printing tank with transparent liquid so as to totally immerse the sprocket, the curved support, the window, and the associated portions of both strips of film;
    placing a gate over the unexposed strip of film at the window location so as to confine both strips of film in their engagement with the sprocket teeth;
    while maintaining tension on the incoming portions of both strips of film, drivingly rotating the main printing sprocket so that the sprocket teeth pull the strips of film in precise registration past the window; and
    continuously pulling both strips of film in a slack loop away from the sprocket and gate.

2. The method of claim 1 which includes the additional step of continuously wiping the optical surfaces of both strips of film, after they are submersed within the liquid and before their arrival at the printing sprocket, so as to remove foreign particles and air bubbles therefrom.

3. A sprocket-registered photographic continuous contact printing apparatus comprising, in combination:
    (a) a printing tank having a bath of transparent liquid therein;
    (b) a stationary housing positioned within said tank and immersed within said liquid, said housing having a surface conforming substantially to a portion of a cylinder;
    (c) a window formed in said surface to provide a printing aperture;
    (d) means for projecting light from within said housing through said window;
    (e) means for feeding a master strip of film and a superimposed unexposed strip of film towards a point of tangency on said surface;
    (f) a printing sprocket rotatably mounted beside said housing and having teeth that project above one curved edge of said surface, said teeth being adapted to engage the perforations on one edge of said strips of film for holding same in perforation register while driving said strips over said surface and past said window;
    (g) a raised support associated with said surface along its other curved edge for slidably supporting the other edge of said strips of film so that a channel is formed between said raised support and said sprocket for the movement of liquid between said window and said strips of film; and (h) means for engaging said unexposed strip of film at said window location so as to hold one edge of said strips of film against said sprocket and the other edge thereof against said raised support.

4. Apparatus as in claim 3 wherein said means for engaging said unexposed strip of film at said window location is a roller gate; and which further includes a stripper disposed adjacent said housing for disengaging said strips of film from said sprocket, and an additional roller cooperating with said stripper to define the path of movement of said strips of film.

5. In a photographic printing machine for transferring images from a master strip of film onto an unexposed strip of film, the combination comprising:
   a printing tank having a body of transparent liquid therein;
   a printing sprocket disposed in a vertical plane and totally immersed within said liquid body;
   means for feeding the master strip of film onto said sprocket at a point of tangency on the under side thereof;
   means cooperating with said sprocket to wrap the master strip of film around a portion of the circumference of said sprocket beyond said point of tangency;
   an illuminated window disposed beside said sprocket and above said thus-wrapped portion of the master strip of film, but spaced therefrom, so that the master strip of film is sprocket-registered while passing through a printing aperture effected by said illuminated window, and at the same time its upper surface is immersed in liquid occupying said space between said window and the master strip of film; and
   means for transporting the unexposed strip of film in sprocket registry with the master strip of film so that photographic images may be transferred from the master strip of film to the unexposed strip of film.

6. A printing machine as claimed in claim 5 which additionally includes two pairs of wiper blades disposed within said tank and liquid body, one for wiping both surfaces of the master strip of film before it is feed onto said sprocket, and the other for wiping both surfaces of the unexposed strip of film prior to the transfer of photographic images thereto.

7. A photographic printing machine as claimed in claim 5 wherein said means for wrapping the master strip of film around said sprocket includes a curved support and upon which one edge of the master strip of film slidably rests, a roller gate cooperating with said sprocket and said curved support to define the pathway of the master strip of film as it passes said window, a stripper disposed adjacent said window for disengaging the master strip of film from said sprocket, and an additional roller cooperating with said striper for defining the pathway of the master strip of film after it has passed said window.

8. A sprocket-registered liquid-immersion apparatus for transfer of photographic images between continuously moving strips of film, comprising, in combination:
   a printing sprocket;
   means for feeding a master strip of film onto the printing sprocket so that it is partially wrapped there-about with the perforations along one edge of the master strip of film being engaged by the sprocket teeth;
   means for feeding another strip of film onto the printing sprocket in superimposed and aligned relationship to the thus-wrapped portion of the master strip of film so that the perforations along one edge of said other strip of film are also engaged by the sprocket teeth;
   a curved support for supporting the other edge of the master strip of film in parallel relationship to said one edge thereof;
   an illuminated window positioned between said printing sprocket and said curved support to effect an aperture;
   a body of transparent liquid immersing said window, said sprocket, said curved support, and the associated portions of both said strips of film;
   said sprocket being adapted to be drivingly rotated to thereby continuously drive both of said strips of film past said illuminated window so that the sprocket teeth acting upon the leading edges of the film strip perforations maintain a precise registration of the two strips of film at the aperture; and
   means providing a separate liquid compartment through which both said strips of film pass before reaching said printing sprocket, said separate compartment containing means for wiping foreign matter and air bubbles from the surfaces of said strips of film as they pass therethrough.

9. In a photographic printing machine for transferring images from a master strip of film onto an unexposed strip of film, the combination comprising:
   a printing tank having a body of transparent liquid therein;
   a main printing sprocket totally immersed within said liquid body;
   means for feeding the master strip of film, with the unexposed strip of film superimposed thereon, onto said sprocket;
   a first pair of entrance wiper blades disposed within said tank and liquid body and adapted for continuously wiping both surfaces of the master strip of film after it enters said liquid body;
   a second pair of entrance wiper blades disposed within said tank and liquid body and adapted for wiping both surfaces of the unexposed strip of film after it enters said liquid body; and
   a pair of contact wiper blades disposed within said tank and liquid body in a position intermediate to said entrance wiper blades and said sprocket, said contact wiper blades being adapted to wipe both the inner surface of the master strip of film and the outer surface of the unexposed strip of film while concurrently bringing the two strips of film into intimate contact prior to their arrival at said sprocket.

10. a photographic printing machine as claimed in claim 9 wherein said printing tank has a vertical bulkhead therein which separates said tank into two separate compartments, one being an entrance compartment and the other being a printing compartment, said two pairs of entrance wiper blades being disposed within said entrance compartment, said bulkhead having an opening therethrough for passage of the strips of film from said entrance compartment into said printing compartment, and said pair of contact wiper blades being mounted upon said bulkhead, adjacent said opening, but within said printing compartment.

11. A continuous photographic printer of the liquid immersion type, comprising, in combination:
- a printing tank in the form of a generally rectangular box, one side wall of said tank being pivotally attached to the bottom wall of the box;
- photographic printing apparatus disposed within said box, including means forming a printing aperture and means for transporting a master strip of film and another strip of film past said aperture, said printing apparatus being permanently supported from the other side wall of said box; and
- means for sealing said one side wall to the end walls of said box so that said box may be filled with liquid in order to totally immerse said printing apparatus.

12. A photographic printer of the liquid-immersion type comprising, in combination:
- a printing tank adapted to be filled with a body of transparent liquid;
- a main printing sprocket rotatably supported within said tank;
- a hollow housing disposed beside said sprocket and extending upwardly to the top of said tank;
- a window incorporated in one wall of said housing to be supported thereby and being disposed beside said sprocket to effect a printing aperture; and
- lens means disposed within said housing for conveying light to said window to illuminate the same, said housing being effective to protect said lens means from the liquid with which said tank is filled.

13. A photographic printing machine for transferring images from a master strip of film onto an unexposed strip of film, comprising:
- a printing tank having a body of transparent liquid therein;
- a printing sprocket disposed in a vertical plane and totally immersed within said liquid body;
- means for feeding the master strip of film onto said sprocket at a point of tangency on the underside thereof;
- a pair of entrance wiper blades disposed within said tank and liquid body and adapted for continuously wiping both surfaces of the master strip of film after it enters said liquid body and before it is fed onto said sprocket;
- an arcuately curved support disposed in spaced relationship to said sprocket and parallel to a portion of the circumference of the sprocket taken at the root diameter thereof;
- an illuminated window disposed adjacent said curved support and said sprocket, and above the root diameter of said sprocket, so that the master strip of film is sprocket-registered while passing by said window, and at the same time its upper surface is immersed in liquid occupying the space between said window and the master strip of film;
- means confining the master strip of film upon said sprocket and said curved support as it passes said window; and
- means for transporting the unexposed strip of film in sprocket registry with the master strip of film so that images may be transferred from the master strip of film to the unexposed strip of film.

14. A photographic printing machine as claimed in claim 13 which is adapted for continuous contact printing, and which further includes:
- a second pair of entrance wiper blades disposed within said tank and liquid body and adapted for wiping both surfaces of the unexposed strip of film after it enters said liquid body;
- a pair of contact wiper blades disposed within said tank and liquid body in a position intermediate to said entrance wiper blades and said sprocket, and being adapted to wipe both the inner surface of the master strip of film and the outer surface of the unexposed strip of film while concurrently bringing the two strips of film into intimate contact prior to their arrival at said sprocket;
- a stripper disposed adjacent said sprocket for disengaging the master strip of film therefrom; and
- roller means adjacent said stripper for confining the movement of both strips of film therebetween.

15. A photographic printing machine as in claim 13 wherein said tank is in the form of a generally rectangular box, one side wall being pivotally attached to the bottom wall thereof, and said apparatus being permanently supported from the other side wall of said box.

* * * * *